3,506,651
Patented Apr. 14, 1970

3,506,651
EPOXYSTEROIDS
Taichiro Komeno, Osaka-shi, Japan, assignor to
Shionogi & Co., Ltd., Osaka, Japan
No Drawing. Continuation-in-part of application Ser. No.
649,106, June 27, 1967. This application Apr. 15, 1968,
Ser. No. 721,183
Claims priority, application Japan, June 30, 1966,
41/43,443; Apr. 25, 1967, 42/26,469
Int. Cl. C07c 173/00
U.S. Cl. 260—239.55        26 Claims

ABSTRACT OF THE DISCLOSURE

Strong anti-estrogenic and myogenic compounds of the formula

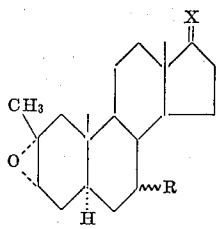

wherein R is a hydrogen or methyl and X is an oxygen function, human and veterinary medicine containing them as an active ingredient, and a process for preparing them.

---

This application is a continuation-in-part application of our application Ser. No. 649,106, filed on June 27, 1967, which is now abandoned.

The present invention relates to a novel class of epoxysteroids, the human and veterinary medicine containing the compound as an active ingredient and the process for production of the compounds of the present invention.

More specifically, the invention relates to 2α,3α-epoxy-2β-methyl-17-oxygenated-5α-androstane compounds substituted or unsubstituted by a methyl group at position seven, generically represented by the formula:

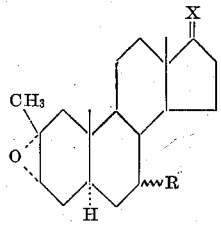

wherein R represents a hydrogen atom or a methyl group; X represents an oxygen atom or a $$\diagup\!\!\!\!\!\!^{OR''}_{\diagdown R'}\text{group}$$

wherein R' is a hydrogen atom or a hydorcarbon group having up to four carbon atoms and R" is a hydrogen atom, a hydrocarboncarboxylic acyl group having up to eleven carbon atoms, alkyl group or cycloalkyl group having up to seven carbon atoms, substituted or unsubstituted by 1-alkoxy residue having one to four carbon atoms; the ripple (∫) represents either α- or β-configuration.

The compounds of the present invention are represented by the above general Formula I. As for the hydrocarbon group represented by R', methyl, ethyl, propyl, butyl, isopropyl, vinyl, propenyl, ethynyl, propynyl groups and the like may be cited; as for the hydrocarboncarboxylic acyl groups represented by R", saturated or unsaturated straight or branched aliphatic, cycloaliphatic or aromatic acyl groups such as formyl, acetyl, propionyl, butyryl, isobutyryl, valeryl, isovaleryl, 2-methylbutyryl, trimethylacetyl, capropyl, enanthoyl, capryloyl, pelargonyl, capryl, undecanoyl, undecenoyl, cyclopentanepropionyl, cyclohexanecarbonyl, benzoyl, β-phenylpropionyl, phenoxyacetyl and the like may be cited; as for the alkyl or cycloalkyl group substituted or unsubstituted by 1-alkoxy group represented by R", methyl, ethyl, propyl, cyclopentyl, cyclohexyl, 1-methoxycyclopentyl, 1-methoxycyclohexyl, 1-ethoxycyclopentyl, 1-ethoxycyclohexyl, 1-propoxycyclopentyl, 1-propoxycyclohexyl, 1-butoxycloheptyl, tetrahydrofuranyl, tetrahydropyranyl groups and the like may be cited.

The illustrative but by no means exhaustive listing of the compounds of the present invention involves:

2α,3α-epoxy-2β-methyl-5α-androstan-17-one,
2α,3α-epoxy-2β-methyl-5α-androstan-17β-ol,
2α,3α-epoxy-2β,17α-dimethyl-5α-androstan-17β-ol,
2α,3α-epoxy-2β-methyl-17α-ethyl-5α-androstan-17β-ol,
2α,3α-epoxy-2β-methyl-17α-vinyl-5α-androstan-17β-ol,
2α,3α-epoxy 2β-methyl-17α-ethynyl-5α-androstan-17β-ol,
2α,3α-epoxy-2β-methyl-17α-propynyl-5α-androstan-17β-ol,
2α,3α-epoxy-2β-methyl-17α-allyl-5α-androstan-17β-ol,
2α,3α-epoxy-2β-methyl-17α-propyl-5α-androstan-17β-ol,
2α,3α-epoxy-2β methyl-17α-isopropyl-5α-androstan-17β-ol,
2α,3α-epoxy-2β,7α-dimethyl-5α-androstan-17-one,
2α,3α-epoxy-2β,7β-dimethyl-5α-androstan-17-one,
2α,3α-epoxy-2β,7α-dimethyl-5α-androstan-17β-ol,
2α,3α-epoxy-2β,7β-dimethyl-5α-androstan-17β-ol,
2α,3α-epoxy-2β,7,17α-trimethyl-5α-androstan-17β-ol,
2α,3α-epoxy-2β,7-dimethyl-17α-ethyl-5α-androstan-17β-ol,
2α,3α-epoxy-2β,7-dimethyl-17α-propyl-5α-androstan-17β-ol,
2α,3α-epoxy-2β,7-dimethyl-17α-vinyl-5α-androstan-17β-ol,
2α,3α-epoxy-2β,7-dimethyl-17α-allyl-5α-androstan-17β-ol,
2α,3α-epoxy-2β,7-dimethyl-17α-propenyl-5α-androstan-17β-ol,
2α,3α-epoxy-2β,7-dimethyl-17α-ethynyl-5α-androstan-17β-ol.

and the like in which the configuration of alkyl group at position 7 is either α or β, and their 1-alkoxycycloalkyl ether such as 1-methoxycyclopentyl ether, 1-ethoxycyclopentyl ether, 1-propoxycyclopentyl ether, 1-butoxycyclopentyl ether, 1-methoxycyclohexyl ether, 1-ethoxycyclohexyl ether, 1-isopropoxycyclohexyl ether, 1-methoxycycloheptyl ether, 1-ethoxycycloheptyl ether and the like or alkyl ether such as methyl, ethyl and benzyl ether, or cycloalkyl ether such as cyclopentyl ether, cyclohexyl ether, tetrahydrofuranyl ether, tetrahydropyranyl ether and the like or their hydrocarboncarboxylic acylates such as formate, acetate, propionate, butyrate, isobutyrate, isovalerate, 2-methylbutyrate, trimethylacetate, caproate, enanthate, caprylate, pelargonate, caprate, undecanoate, undecenoate, cyclopentane-propionate, cyclohexanecarbonate, benzoate, 3-phenylpropionate, phenoxyacetate and the like.

The compounds of this invention are useful for their pharmacological and physiological activities, such as strong antiestrogenic activity, uterotropic activity, implantation delay effect, antimammary growth activity, implantation inhibition, myogenic activity, androgenic activity, estrogenic activity, uterotropic activity, antiutero-tropic activity, enhancement of estrogenic activity of estrogens, etc. For example, in spite of weaker myotropic effect of 2α,3α-epoxy-5α-androstan-17β-ol, the introduction of a methyl group at position 2 resulted increase of the potency to the extent of 15 times as that of the mother compound. It should be noted that the introduction of the same methyl group at position 3 of the mother compound resulted in significant reduction of the same activity. Moreover, 2α,3α-epoxy-2β,7α-dimethyl-5α-androstan-17β-ol all exhibits strong antiestrogenic activity, antimammary growth activity, implantation inhibition, myogenic activity, androgenic activity, estrogenic activity, and the like.

These physiological activity indicate that the compounds of the present invention are useful for human, poultry and veterinary medicaments, additives to food stuffs or baits in a manner per se conventional, for treatment of many diseases or conditions demanding these activities. For instance, they may be utilized for treatment of mastopathy, endometriosis, corpulency, prevention of conception, malnutrition, recovery from emaciation, convalescence, senility, wasting diseases and disorders of nutrition, promotion of growth of immature infant, promotion of granulation, increase in body weight, etc., for human, veterinary or poultry use in a daily dose from 1γ to 500 mg.

The compounds of the present invention may be utilized in a wide variety of oral or parenteral dosage forms, solely or in admixture with co-acting agents. They may be administered in a solid composition such as tablets, capsules, pills, if required in a unit dosage form, powders, granules, or the like, or in liquid compositions such as injections, ointments, suspensions, solutions, emulsions, syrups, elixirs, oils or the like. They may be flavoured, colored and tablets, granules or pills may be coated. The preparations are prepared by conventional methods in conjunction with a solid or liquid pharmaceutical excipients. Suitable excipients include water, vegetable oils such as cacao oil, olive oil, peanut oil, sesame oil, etc., glycerin, glycols, esters of lower alcohols with fatty acids, fatty acids, isopropyl myristate, benzyl alcohol, polyethyleneglycols, gelatine, sucrose, glucose, lactose, starches sodium alginate, magnesium stearate, talc, kaolin, bentonite, boric acid, calcium phosphate, calcium carbonate, sodium chloride, sodium benzoate, Vaseline, paraffin, acacia, tragacanth, agar, fats, lard, wool fat, resins, coloring agents, flavouring substances, emulsifying agents solubilizing agent, buffers, stabilizers, disinfectants, etc.

The process of the present invention comprises reaction of 2-methyl-17-oxygenated-5α-androst -2-ene derivatives represented by the general formula:

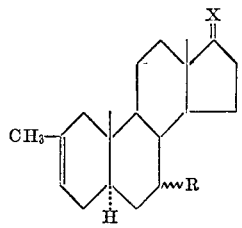

wherein R, X and the ripple mark represent the same significances as above, with an epoxidizing agent to afford the compounds of the present invention represented by the general Formula I.

The starting materials of the present invention represented by the general Formula II are exemplified by:

2-methyl-5α-androst-2-en-17-one,
2-methyl-5α-androst-2-en-17β-ol,
2,17α-dimethyl-5α-androst-2-en-17β-ol,
2-methyl-17α-ethyl-5α-androst-2-en-17β-ol,
2-methyl-17α-vinyl-5α-androst-2-en-17β-ol,
2-methyl-17α-ethynyl-5α-androst-2-en-17β-ol,
2-methyl-17α-propyl-5α-androst-2-en-17β-ol,
2-methyl-17α-allyl-5α-androst-2-en-17β-ol,
2-methyl-17α-propynyl-5α-androst-2-en-17β-ol,
2-methyl-17α-isopropyl-5α-androst-2-en-17β-ol,
2,7-dimethyl-5α-androst-2-en-17-one,
2,7-dimethyl-5α-androst-2-en-17β-ol,
2,7,17α-trimethyl-5α-androst-2-en-17β-ol,
2,7-dimethyl-17α-ethyl-5α-androst-2-en-17β-ol,
2,7-dimethyl-17α-propyl-5α-androst-2-en-17β-ol,
2,7-dimethyl-17α-vinyl-5α-androst-2-en-17β-ol,
2,7-dimethyl-17α-allyl-5α-androst-2-en-17β-ol,
2,7-dimethyl-17α-propenyl-5α-androst-2-en-17β-ol,
2,7-dimethyl-17α-ethynyl-5α-androst-2-en-17β-ol, and the like, in which the configuration of alkyl group at position 7 is either α or β, and their 1-alkoxycycloalkyl ethers such as 1-methoxycyclopentyl ether, 1-ethoxycyclopentyl ether, 1-propoxycyclopentyl ether, 1-butoxycyclopentyl ether 1-methoxycyclohexyl ether, 1-ethoxycyclohexyl ether, 1-isopropoxycyclohexyl ether, 1-methoxycycloheptyl ether, 1-ethoxycycloheptyl ether, 1-propoxycycloheptyl ether and the like, or alkyl ether such as methyl, ethyl, propyl, benzyl ether and the like, or cycloalkyl ether such as cyclopentyl, cyclohexyl, tetrahydrofuranyl or tetrahydropyranyl ether, and the like, or their hydrocarbon carboxylic acylates such as formate, acetate, propionate, butyrate, isobutyrate, isovalerate, 2-methylbutyrate, trimethylacetate, caproate, enanthate, caprylate, perargonate, caprate, undecanoate, undecenoate, cyclopentylpropionate, cyclohexanecarboxylate, benzoate, 3-phenylpropionate, phenoxyacetate and the like.

The above described starting materials and processes for their preparation are described by A. D. Cross et al., J. Med. Chem., vol. 6, p. 162 (1963). The 7-methyl-3-oxo-5α-androstane compounds are described in British Patent No. 1,027,268 and are alkylated at the 2-position according to the process described by H. J. Ringold et al., J.A.C.S., vol. 81, p. 427 (1959). The oxo group thereof may be reduced with lithium aluminum hydride and dehydrated according to the method of Cross et al., supra, to obtain the 7-alkyl starting materials.

As for the epoxidizing agent utilized in the present invention, an aliphatic peracid such as performic acid, peracetic acid, perpropionic acid, perbutyric acid, monopersuccinic acid, percamphoric acid, trifluoroperacetic acid, etc., or an aromatic peracid such as perbenzoic acid, monoperphthalic acid, diperterephthalic acid, nitroperbenzoic acid, m-chloroperbenzoic acid or the like, or alkaline hydrogen peroxide, etc., may be cited.

The reaction of the present invention may be carried out in the presence of an inert solvent such as ligroin, benzene, methylene chloride, chloroform, ether, dioxane, tetrahydrofuran, acetone, acetic acid, propionic acid, acetonitrile, ethyl acetate, butyl acetate, tert.-butanol, ethanol, methanol etc., at a temperature of range between −25° C. and 100° C. Preferably a temperature between −10° C. and 50° C. is selected. Higher temperature may be selected so as to facilitate the reaction.

Duration of the reaction period varies according to nature and concentration of reactants and temperature. The reaction is not affected by substitution of air with an inert gas.

The products of the process of the present invention may be isolated by a conventional manner from the reaction mixture. The peracids and acids are removed by extraction with an aqueous base, the resulting substance is obtained by, for example, evaporation of solvent, if required, after washing. The crude product may be purified by conventional manner, such as recrystallization, chromatography, treating with decolorizing carbon and the like.

The process of this invention involves transformation of the products within the definition of the function at position 17. Thus, when a product has free hydroxy group at position 17, it may be acylated in a conventional manner with an acylating agent such as acid anhydride or acid halide, in the presence of a base to afford the 17-acylate cited above, or it may be treated with dihydrofuran, dihydropyran, 1-alkoxycycloalkene such as 1-methoxycyclopentene, 1-ethoxycyclohexene etc., 1,1-dialkoxycycloalkane such as 1,1-diethoxycyclopentane, 1,1-dimethoxycyclohexane, etc., to obtain tetrahydrofuranyl ether, tetrahydropyranyl ether, 1 - methoxycyclopentyl ether, 1-ethoxycyclohexyl ether, 1-ethoxycyclopentyl ether, 1-methoxycyclohexyl ether or the like or it may be oxidized with an oxidizing agent such as chromium trioxide, Jones' reagent, etc., to obtain the corresponding 17-oxo compound. When the product has 17-ether group or 17-ester group, it may be reacted with an aqueous acid or an aqueous base to give 17-hydroxy compound. When the product has 17-oxo group, it may be reacted with a reducing agent, a Grignard reagent or an organic lithium compound to afford the corresponding compounds having

moiety in which R′ is a hydrocarbon atom or a hydrocarbon group. When the product has unsaturated 17α-substituent, it may be hydrogenated with an adequate method to prepare a compound in which R′ is an alkyl group or an alkenyl group.

The following examples are given by way of illustration only and are not intended as limitation of the scope of the present invention, many apparent variations of which are possible without departing from the spirit and scope of the present invention.

EXAMPLE 1

To a solution of 2-methyl-5α-androst-2-en-17β-ol acetate (1.955 g.) in a mixture of 20 ml. of methylene chloride and 20 ml. of ether, there is added 15 ml. of monoperphthalic acid in ether (109 mg./ml.) and left standing overnight at 0° C. The reaction mixture is washed with aqueous sodium carbonate solution, dried over anhydrous sodium sulfate and freed from the solvent. The residue is recrystallized from acetone to afford 1.601 g. of 2α,3α-epoxy-2β-methyl-5α-androstan - 17β - ol acetate, M.P. 208–210° C. $[\alpha]_D^{24}+10.6°$ (c.=1.073, chloroform).

EXAMPLE 2

2α,3α-epoxy-2β-methyl-5α-androstan - 17β - ol acetate (804 mg.) prepared by the process described in Example 1 is dissolved in 50 ml. of methanol, and there is added 800 mg. of potassium carbonate in 6 ml. of water to the solution. The resultant mixture is refluxed for 4 hours, diluted with water and extracted with methylene chloride. The extract solution is washed with water, dried and evaporated. The residue is recrystallized from acetone-hexane to obtain 626 mg. of 2α,3α-epoxy-2β-methyl-5α-androstan-17β-ol, M.P. 184–186° C. $[\alpha]_D^{23}+21.0°$ (c.=1.013, chloroform).

EXAMPLE 3

To a solution of 2α,3α-epoxy-2β-methyl-5α-androstan-17β-ol (432 mg.) in 2 ml. of pyridine, there is added propionic anhydride (0.5 ml.) and the resultant mixture is allowed to stand overnight at room temperature. The reaction mixture is diluted with ice-cold water and the formed crystals are collected by filtration. Recrystallization of crude crystal from methanol affords 498 mg. of 2α,3α - epoxy - 2β - methyl - 5α - androstan - 17β - ol propionate, IR: $\nu_{max.}^{Nujol}$ 1734, 1239 cm$^{-1}$ In the similar manner, 2α,3α-epoxy-2β-methyl-5α-androstan-17β-ol is converted to the corresponding acylates, for example, valerate, isovalerate, enanthate and caprylate by the respective reaction with more than equimolar amount of valeric anhydride, isovaleric anhydride, enanthic anhydride and caprylic anhydride in the presence of pyridine.

EXAMPLE 4

To a solution prepared by admixture of chromium trioxide (1 g.) and pyridine (25 ml.) under external ice-cooling, 2α,3α - epoxy - 2β - methyl - 5α - androstan - 17β-ol (1 g.) in pyridine (20 ml.) is added at the same temperature. The resultant mixture is stirred for 1 hour and left at room temperature overnight. The reaction mixture is diluted with ice water and extracted with chloroform. The extract solution is washed with water, diluted hydrochloric acid, aqueous sodium carbonate solution and water in order and then evaporated. The residue is chromatographed over neutral alumina and the eluate with petroleum ether-benzene fraction is recrystallized from methanol to give 2α,3α-epoxy-2β-methyl-5α-androstan-17-one, M.P. 173–177° C.

EXAMPLE 5

To a solution of 2-methyl-5α-androst-2-en-17β-ol (1.502 g.) in a mixture of 20 ml. of methylene chloride and 20 ml. of ether, there is added 15 ml. of monoperphthalic acid in ether (109 mg./ml.) and left standing overnight at 0° C. The reaction mixture is worked up as in Example 1 to yield 1.231 g. of 2α,3α-epoxy-2β-methyl-5α-androstan-17β-ol, M.P. 184–186° C.

EXAMPLE 6

To a suspension of 2α,3α-epoxy-2β-methyl-5α-androstan-17β-ol (560 mg.) in tert.-butanol (5 ml.), there is added cyclopentanone enol methyl ether (1 ml.) and p-toluenesulfonic acid pyridine salt (10 mg.). The resultant mixture is stirred for 4 hours at room temperature and poured into an aqeuous diluted sodium carbonate solution. The mixture is extracted with methylene chloride and the resultant extract is worked up as usual to obtain crude product (636 mg.), which affords 17β-(1-methoxycyclopentyl) - oxy-2α,3α-epoxy-2β-methyl-5α-androstane (534 mg.) by chomatography over alumina, M.P. 123–125° C.

In a similar manner as above but substituting cyclopentanone enol methyl ether with cyclohexanone enol methyl ether affords 17β-(1-methoxycyclohexyl)oxy-2α,3α-epoxy-2β-methyl-5α-androstane, M.P. 153–155° C.

EXAMPLE 7

To a solution of 2,17α-dimethyl-5α-androst-2-en-17β-ol (2.010 g.) in a mixture of 20 ml. of dichloromethane and 20 ml. of ether, there is added 16 ml. of monoperphthalic acid in ether (109 mg./ml.) and left standing over night at 0° C. The reaction mixture is washed with aqueous sodium carbonate, dried over sodium sulfate and freed from the solvent. The residue is recrystallized from acetone to give 1.557 g. of 2α,3α-epoxy-2β,17α-dimethyl-5α-androstan-17β-ol, M.P. 157–158° C.

EXAMPLE 8

To a solution of 2-methyl-17α-ethynyl-5α-androst-2-en-17β-ol (1.00 g.) in a mixture of 8 ml. of dichloromethane and 8 ml. of ether, there is added 8 ml. of monoperphthalic acid in ether (109 mg./ml.) and left standing overnight at 0° C. The reaction mixture is washed with aqueous sodium carbonate solution, dried over anhydrous sodium sulfate and freed from the solvent. The residue is recrystallized from acetone to give 2α,3α-epoxy-2β-methyl-17α-ethynyl-5α-androstan-17β-ol, M.P. 175–177° C.

EXAMPLE 9

Into 30 ml. of tetrahydrofuran-ether (2:1) mixture, there is introduced dry acetylene gas for 1 hour. To the solution, a solution of 1.5 g. potassium metal in anhydrous amyl alcohol (10 ml.) is added. Under stirring, 2α,3α-epoxy-2β-methyl-5α-androstan-17-one (1.350 g.) in tetrahydrofuran-ether mixture (1:1) is added dropwise into the above mixture within 30 minutes during which acetylene gas is introduced therein. After stirring and introduction of acetylene gas for 3 hours, there is added aqueous ammonium chloride solution. The resultant mixture is extracted with ether and the extract is washed with water, aqueous sodium carbonate solution and water in order, dried over anhydrous sodium sulfate and evaporated. The residue is recrystallized from methylene chloride-methanol mixture to yield 1.280 g. of 2α,3α-epoxy-2β-methyl-17α-ethynyl-5α-androstan-17β-ol, M.P. 175–177° C.

EXAMPLE 10

To a suspension of Lindlar catalyst (400 mg.) in 10 ml. of ethyl acetate, there is added a solution of 2α,3α-epoxy-2β-methyl-17α-ethynyl-5α-androstan-17β-ol (409 mg.) in a mixture of 5 ml. ether and 10 ml. ethyl acetate and the resultant mixture is hydrogenated. After 15 minutes, the reaction mixture is filtered to remove the catalyst and the filtrate is evaporated. The residue is recrystallized from methylene chloride-methanol mixture to yield 356 mg. of 2α,3α - epoxy - 2β-methyl-17α-vinyl-5α-androstan-17β-ol, M.P. 82–88° C.

EXAMPLE 11

A solution of 136 mg. 2α,3α-epoxy-2β-methyl-17α-ethynyl-5α-androstan-17β-ol in 25 ml. ethyl acetate is hydrogenated over pre-reduced 300 mg. of 10% palladized calcium carbonate catalyst for 15 mintues. The reaction mixture is worked up as in Example 10 to yield 98 mg. of 2α,3α - epoxy - 2β-methyl-17α-ethyl-5α-androstan-17β-ol, M.P. 129–131° C.

EXAMPLE 12

A solution of 364 mg. 2,7α-dimethyl-5α-androst-2-en-17β-ol acetate in 8 ml. methylene chloride is added with 237 mg. m-chloroperbenzoic acid and stirred for 3 hours at room temperatures. The reaction mixture is diluted with 20 ml. methylene chloride, washed with aqueous sodium carbonate and water, dried with anhydrous sodium sulfate and evaporated to dryness. Purification of residue (395 mg.) by thin layer chromatography affords 330 mg. 2β,7α-dimethyl-2α,3α-epoxy-5α-androstan-17β-ol acetate, M.P. 125–126° C.

EXAMPLE 13

A solution of 1.085 g. 2,7α-dimethyl-5α-androst-2-en-17β-ol in 30 ml. methylene chloride is added with 1.0 g. monoperphthalic acid in 10 ml. ether, and left standing overnight at room temperature. The reaction mixture is decanted, diluted with 50 ml. methylene chloride, washed with aqueous sodium carbonate, and water, dried with anhydrous sodium sulfate and evaporated to dryness. Purification of the residue by thin layer chromatography gives 1.029 g. 2β,7α - dimethyl-2α,3α-epoxy-5α-androstan-17β-ol, M.P. 168–169° C.

EXAMPLE 14

Following the procedure described in Example 13, but substituting 2,7α - dimethyl-5α-androst-2-en-17β-ol or its acetate with 2,7α - dimethyl-17α-ethynyl-5α-androst-2-en-17β-ol or 2,7α,17α-trimethyl-5α-androst-2-en-17β-ol, there is obtained 2α,3α - epoxy-2β,7α-dimethyl-17α-ethynyl-5α-androstan-17β-ol or 2α,3α-epoxy-2β,7α-17α-trimethyl-5α-androstan-17β-ol.

EXAMPLE 15

A solution of 330 mg. 2β,7α-dimethyl-2α,3α-epoxy-5α-androstan-17β-ol acetate in 23 ml. methanol is added with a solution of 378 mg. sodium carbonate in 4.5 ml. water and left standing overnight at room temperature. Then the mixture is refluxed for 50 minutes and diluted with 10 ml. iced water. The solution is extracted with methylene chloride. The extract is washed with water, dried over ananhydrous sodium sulfate and freed from solvent. The residue is recrystallized from acetone to give 205 mg. 2α,3α-epoxy-2β,7α-dimethyl-5α-androstan-17β-ol, M.P. 168–169° C.

EXAMPLE 16

A solution of 50 mg. 2α,3α - epoxy-2β,7α-dimethyl-5α-androstan-17β-ol in 1 ml. pyridine is added with 0.5 ml. acetic anhydride and left standing for two days at room temperature. The reaction mixture is poured onto ice water and extracted with dichloromethane. The extract is washed with diluted hydrochloric acid, aqueous sodium carbonate and water, dried and evaporated to give 53 mg. residue. Recrystallization of the residue from mixture of acetone and ether to give 2α,3α-epoxy-2β,7α-dimethyl-5α-androstan-17β-ol acetate, M.P. 125–126° C.

EXAMPLE 17

A solution of 86 mg. 2α3α-epoxy-2β,7α-dimethyl-5α-androstan-17β-ol in 3 ml. tert.-butanol is added with 0.3 ml. 1-methoxycyclopentene and 2 mg. of salt of pyridine with p-toluenesulfonic acid. The mixture is stirred for four hours at room temperature. The reaction mixture is poured onto aqueous sodium carbonate and extracted with dichloromethane. The extract is washed with water and dried over sodium sulfate and evaporated to remove solvent. Recrystallization of the residue affords 90 mg. 17β-(1-methoxy-cyclopentyl)oxy - 2α,3α - epoxy - 2β,7α-dimethyl-5α-androstane.

EXAMPLE 18

(A) A solution of 110 mg. 2α3α-epoxy-2β,7α-dimethyl-5α-androstan-17β-ol in 5 ml. acetone is titrated with Jones' reagent until the color of chromic acid ion remains at least 15 seconds. The mixture is added with 5 ml. of aqueous sodium carbonate and freed from acetone. The resultant mixture is extracted with dichloromethane, washed with water, dried over anhydrous sodium sulfate, and evaporated. Recrystallization of the residue from acetone hexane gives 101 mg. 2α,3α-epoxy-2β,7α-dimethyl-5α-androstan-17-one.

(B) A solution of 68 mg. 2α,3α-epoxy-2β,7α-dimethyl-5α-androstan-17-one in a mixture of 1.5 ml. tetrahydrofuran and 1.5 ml. ether is dropped into a solution of 80 mg. potassium metal in a mixture of 1.5 ml. tetrahydrofuran and 1.5 ml. ether saturated with acetylene gas. The mixture is bubbled with acetylene gas for 3 hours, and then aqueous ammonium chloride is added thereto. The reaction mixture is washed successively with water, aqueous sodium carbonate and water, dried over anhydrous sodium sulfate and evaporated. Recrystallization of the residue from acetone affords 62 mg. 2α,3α-epoxy-2β,-7α-dimethyl-17α-ethynyl-5α-androstan-17β-ol.

(C) 2α,3α-epoxy-2β,7α-dimethyl-17α-ethynyl-5α-androstan-17β-ol (20 mg.) is hydrogenated over Lindlar catalyst in 50 mg. ethyl acetate. After 20 minutes, the catalyst is removed and the residual solution is evaporated. Purification of the residue by thin layer chromatography affords 15 mg. 2α,3α-epoxy-2β,7α - dimethyl-17α-vinyl-5α-androstan-17β-ol.

What I claim is:

1. A compound of the general formula:

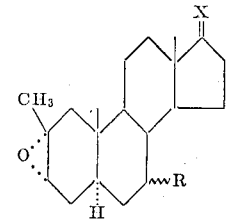

wherein R represents a hydrogen atom or a methyl group; X represents an oxygen atom, or a group

wherein R' is a hydrogen atom or a hydrocarbon group having up to four carbon atoms and R" is a hydrogen atom, a hydrocarboncarboxylic acyl group having up to eleven carbon atoms, alkyl group or cycloalkyl group having up to seven carbon atoms, substituted or unsubstituted by 1-alkoxy residue having one to four carbon atoms; the ripple mark (︴) represents either α- or β-configuration.

2. A compound claimed in claim 1, namely, 2α,3α-epoxy-2β-methyl-5α-androstan-17-one.

3. A compound claimed in claim 1 namely, 2α,3α-epoxy-2β-methyl-5α-androstan-17β-ol.

4. A compound claimed in claim 1, namely, 2α,3α-epoxy-2β-methyl-5α-androstan-17β-ol lower alkanoate.

5. A compound claimed in claim 1 namely, 2α,3α-epoxy-2β-methyl-5α-androstan-17β-ol acetate.

6. A compound claimed in claim 1, namely, 2α,3α-epoxy-2β-methyl-5α-androstan-17β-ol propionate.

7. A compound claimed in claim 1 namely, 2α,3α-epoxy-2β-methyl-5α-androstan-17β-ol valerate.

8. A compound claimed in claim 1, namely, 2α,3α-epoxy-2β-methyl-5α-androstan-17β-ol isovalerate.

9. A compound claimed in claim 1, namely, 2α,3α-epoxy-2β-methyl-5α-androstan-17β-ol enanthate.

10. A compound claimed in claim 1, namely, 2α,3α-epoxy-2β-methyl-5α-androstan-17β-ol caprylate.

11. A compound claimed in claim 1, namely, 17β-(1-lower-alkoxycycloalkyl)oxy - 2α,3α-epoxy-2β-methyl-5α-androstane.

12. A compound claimed in claim 1, namely, 17β-(1-methoxycyclopentyl)oxy - 2α,3α - epoxy - 2β-methyl-5α-androstane.

13. A compound claimed in claim 1, namely, 17β-(1-methoxycyclohexyl)oxy - 2α,3α - epoxy - 2β-methyl-5α-androstane.

14. A compound claimed in claim 1, namely, 2α,3α-epoxy-2β,17α-dimethyl-5α-androstan-17β-ol.

15. A compound claimed in claim 1, namely, 2α,3α-epoxy-2β-methyl-17α-ethynyl-5α-androstan-17β-ol.

16. A compound claimed in claim 1, namely, 2α,3α-epoxy-2β-methyl-17α-vinyl-5α-androstan-17β-ol.

17. A compound claimed in claim 1, namely, 2α,3α-epoxy-2β-methyl-17α-ethyl-5α-androstan-17β-ol.

18. A compound claimed in claim 1, namely, 2α,3α-epoxy-2β,7α-dimethyl-5α-androstan-17-one.

19. A compound claimed in claim 1 namely, 2α,3α-epoxy-2β,7α-dimethyl-5 -androstan-17β-one.

20. A compound claimed in claim 1 namely, 2α,3α-epoxy-2β,7α,17α-trimethyl-5α-androstan-17β-ol.

21. A compound claimed in claim 1, namely, 2α,3α-epoxy-2β,7α-dimethyl-17α-vinyl-5α-androstan-17β-ol.

22. A compound claimed in claim 1, namely, 2α,3α-epoxy-2β,7α-dimethyl-17α-ethynyl-5α-androstan-17β-ol.

23. A compound claimed in claim 1, namely, 2α,3α-epoxy-2β,7α-dimethyl - 5α-androstan-17β-ol lower alkanoate.

24. A compound claimed in claim 1, namely, 2α,3α-epoxy-2β,7α-dimethyl-5α-androstan-17β-ol acetate.

25. A compound claimed in claim 1, namely, 2α,3α-epoxy-2β,7α-dimethyl-17β - (1-alkoxycycloalkyl) oxy-5α-androstane.

26. A compound claimed in claim 1, namely, 2α,3α-epoxy-2β,7α-dimethyl-17β - (1 - methoxycyclopentyl)oxy-5α-androstane.

References Cited

UNITED STATES PATENTS

| 3,203,966 | 8/1965 | Counsell et al. | 260—397.5 |
| 3,080,398 | 3/1963 | Bowers et al. | 260—397.4 |
| 3,290,295 | 12/1966 | Klimstra et al. | 260—239.55 |
| 3,341,523 | 9/1967 | Komeno | 260—239.5 |

FOREIGN PATENTS

| 401,040 | 4/1966 | Switzerland. |

OTHER REFERENCES

Fajkos, J., et al., Coll'n Czech. Chem. Comm., V. 24, 1959; pp. 3115–3135, pp. 3115–3120, 3123, 3126, and 3127 pertinent.

ELBERT L. ROBERTS, Primary Examiner

E. G. LOVE, Assistant Examiner

U.S. Cl. X.R.

424—241